(12) United States Patent
Davis et al.

(10) Patent No.: US 9,902,197 B2
(45) Date of Patent: Feb. 27, 2018

(54) WHEEL ASSEMBLY

(71) Applicants: Delroy Davis, Baltimore, MD (US);
Barbara Davis, Baltimore, MD (US)

(72) Inventors: Delroy Davis, Baltimore, MD (US);
Barbara Davis, Baltimore, MD (US)

( * ) Notice: Subject to any disclaimer, the term of this patent is extended or adjusted under 35 U.S.C. 154(b) by 0 days.

(21) Appl. No.: 14/142,887

(22) Filed: Dec. 29, 2013

(65) Prior Publication Data
US 2017/0080750 A1 Mar. 23, 2017

(51) Int. Cl.
*B60B 25/00* (2006.01)
*B60B 25/22* (2006.01)

(52) U.S. Cl.
CPC .......... *B60B 25/006* (2013.01); *B60B 25/004* (2013.01); *B60B 25/22* (2013.01); *B60B 2900/112* (2013.01); *B60B 2900/5116* (2013.01)

(58) Field of Classification Search
CPC ... B60B 25/002; B60B 25/006; B60B 25/008; B60B 25/22; B60B 25/004
USPC ........ 301/95.106, 95.11, 95.101, 99, 64.305, 301/64.306; 152/405, DIG. 10
See application file for complete search history.

(56) References Cited

U.S. PATENT DOCUMENTS

| | | | | |
|---|---|---|---|---|
| 1,365,555 A | * | 1/1921 | Sieven | B60B 25/20 |
| | | | | 301/35.1 |
| 2,219,156 A | * | 10/1940 | Yankee | B60B 25/16 |
| | | | | 301/11.1 |
| 6,027,176 A | * | 2/2000 | Kuhl | B60B 3/002 |
| | | | | 301/11.1 |
| 6,193,321 B1 | | 2/2001 | Cvijanovic et al. | |
| 6,595,595 B1 | | 7/2003 | Hui | |
| 7,178,880 B2 | * | 2/2007 | Andersen | B60B 29/00 |
| | | | | 29/273 |
| 7,275,575 B2 | | 10/2007 | Hodges et al. | |
| 7,475,950 B1 | * | 1/2009 | Glenn | B60B 3/085 |
| | | | | 188/17 |
| 7,703,859 B2 | | 4/2010 | Hodges et al. | |
| 7,922,261 B2 | | 4/2011 | Gartner | |
| 8,074,946 B2 | * | 12/2011 | Goetz | B65H 75/366 |
| | | | | 137/355.12 |
| 8,919,890 B2 | * | 12/2014 | Anca | B60B 3/002 |
| | | | | 301/63.103 |
| 2005/0264095 A1 | | 12/2005 | Eberhard | |

(Continued)

FOREIGN PATENT DOCUMENTS

DE WO 2009049762 A1 * 4/2009 ............. B60B 23/10

*Primary Examiner* — Kip T Kotter
*Assistant Examiner* — Scott A Browne

(57) ABSTRACT

A wheel assembly having two cylindrical bodies, each with a diameter approximately the same as the interior diameter of a tire. On the front body, are found an outer edge on one side and bolt receiving means on the opposite site and alignment holes. On the back body is found an outer edge, bolt receiving means that run across the entire length of the back body, are located on the interior of the body and are placed equidistant around the body. Each bolt receiving means aligns with a complementary bolt receiving means on the front body. The back body also has alignment pegs that fit into the alignment holes of the front body for proper alignment of the front and hack bodies. Holes on the hub, located on the front body permit placement of the tire and wheel assembly onto an axle of an automobile or other wheeled device.

2 Claims, 15 Drawing Sheets

(56) References Cited

U.S. PATENT DOCUMENTS

| | | |
|---|---|---|
| 2006/0012240 A1* | 1/2006 | Andersen .................. B60B 3/16 |
| | | 301/35.629 |
| 2006/0017316 A1 | 1/2006 | Rodrigues et al. |
| 2007/0176481 A1* | 8/2007 | MacHamer ............. B60B 3/008 |
| | | 301/35.621 |
| 2009/0139116 A1* | 6/2009 | Noonan .................... B60B 1/06 |
| | | 37/265 |
| 2011/0233992 A1 | 9/2011 | Hino |
| 2013/0069421 A1 | 3/2013 | Gilbert et al. |
| 2013/0127234 A1* | 5/2013 | Maeyama ............... B60B 23/10 |
| | | 301/37.101 |
| 2013/0169028 A1* | 7/2013 | Putz ........................ B60B 23/06 |
| | | 301/64.307 |

* cited by examiner

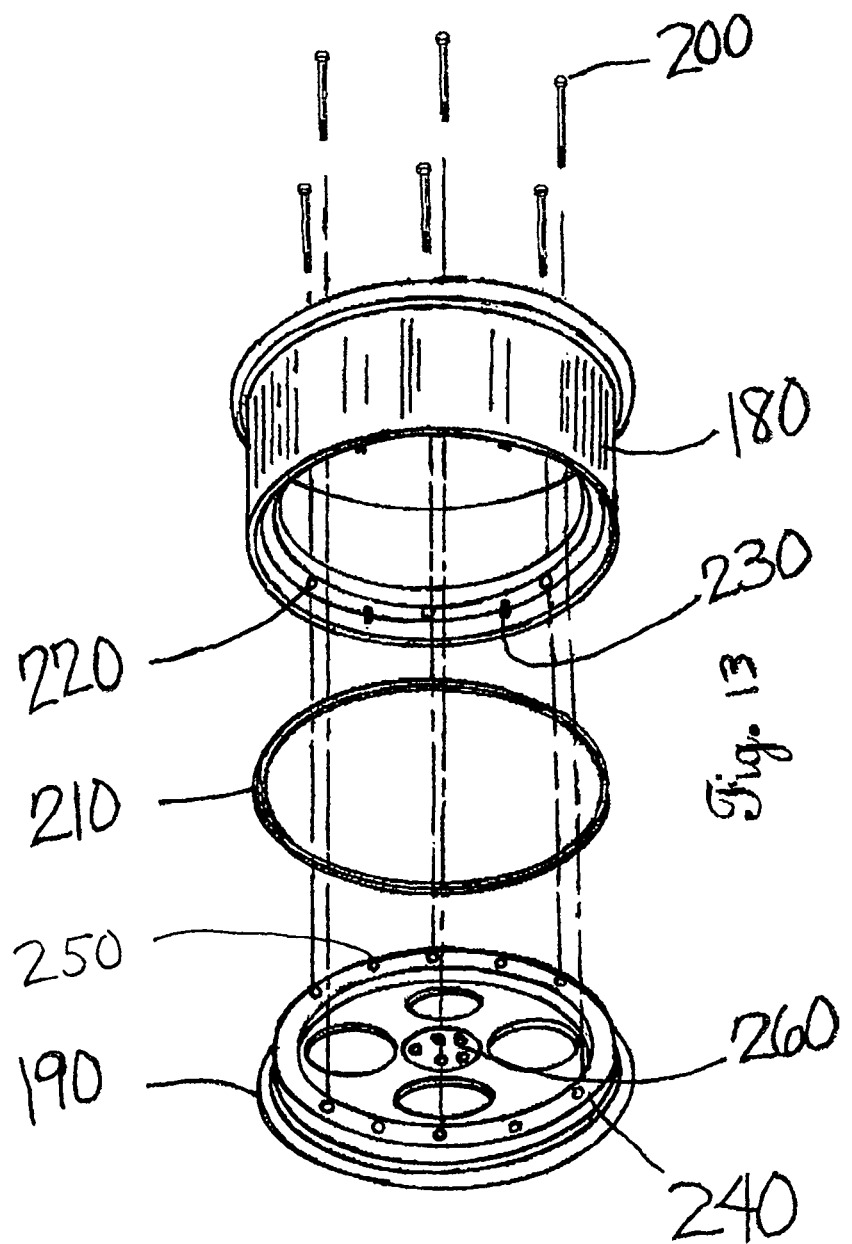

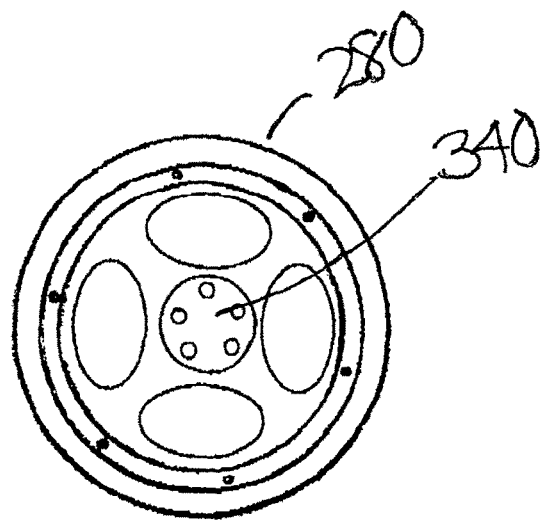
Fig. 18
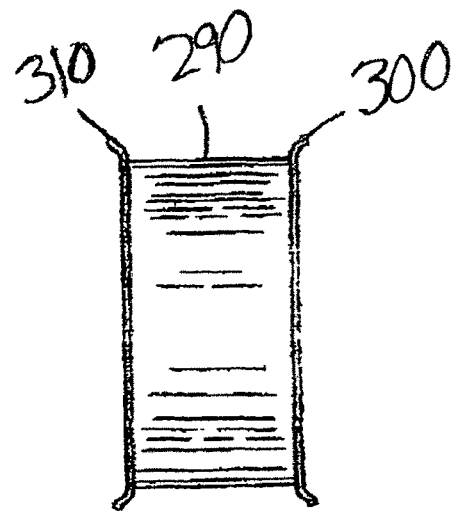
Fig. 19
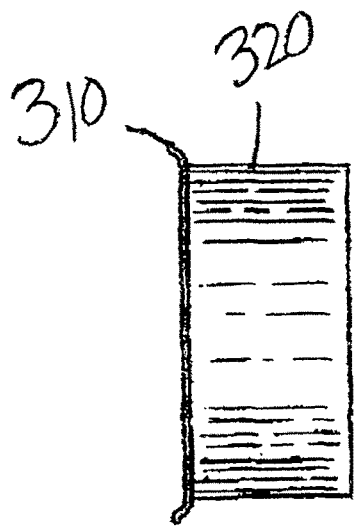
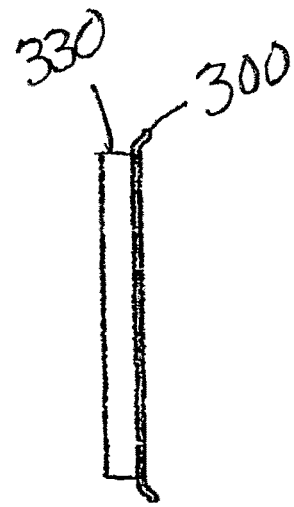
Fig. 20

WHEEL ASSEMBLY

BACKGROUND OF THE INVENTION

Field of the Invention

The present invention relates to a wheel assembly for use with automobile tires.

Description of the Prior Art

Wheel assemblies have been described, for example in U.S. Pat. No. 7,922,261 to Gartner which discloses a cast wheel rim and Hino in US Pat App Publication No US 2011/0233992. Wheel assemblies made of two rim pieces has been disclosed, for example in U.S. Pat. No. 6,193,321 to Cvijanovic et al. Wheel assemblies made to be lightweight in design and materials have been disclosed in US Pat App Publication No US 2006/0017316 to Rodrigues et al. While the above-described devices fulfill their respective, particular objectives and requirements, the aforementioned patents do not describe a wheel assembly made of two cylindrical bodies held together by bolt with a gasket there between as is described in the present invention Therefore, a need exists for a new and improved wheel assembly. In this regard, the present invention substantially fulfills this need. In this respect, the wheel assembly according to the present invention substantially departs from the conventional concepts and a design of the prior art, and in doing so provides an improved wheel assembly.

SUMMARY OF THE INVENTION

In view of the foregoing disadvantages inherent in the known types of wheel assembly now present in the prior art, the present invention provides an improved wheel assembly, and overcomes the above-mentioned disadvantages and drawbacks of the prior art. As such, the general purpose of the present invention, which will be described subsequently in greater detail, is to provide a new and improved wheel assembly which has all the advantages of the prior art mentioned heretofore and many novel features that result in a wheel assembly which is not anticipated, rendered obvious, suggested, or even implied by the prior art, either alone or in any combination thereof.

To attain this, the present invention essentially comprises a wheel assembly having two cylindrical bodies, each with a diameter approximately the same as the interior diameter of a fire. On the front body, are found an outer edge on one side and bolt receiving means on the opposite site and alignment holes. On the back body is found an outer edge, bolt receiving means that ran across the entire length of the back body, are located on the interior of the body and are placed equidistant around the body. Each bolt receiving means aligns with a complementary bolt receiving means on the front body. The back body also has alignment pegs that fit into the alignment holes of the front body for proper alignment of the front and back bodies. The wheel assembly also includes bolts that run through the back body, into and through the bolt receiving means in the front body. A gasket is disposed between the front and back bodies so that in assembly an air tight seal is formed. Holes on the hub, located on the front body permit placement of the tire and wheel assembly onto an axle of an automobile or other wheeled device.

In some embodiments the front and back bodies are of equal size. In other embodiments either the front body is larger or the back body is larger.

Thus has been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in, the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wheel assembly that has all of the advantages of the prior art rims and none of the disadvantages.

It is another object of the present invention to provide a new and improved wheel assembly that may be easily and efficiently manufactured and marketed.

An even further object of the present invention is to provide a new and improved wheel assembly that has a low cost of manufacture with regard to both materials and labor, and which accordingly is then susceptible of low prices of sale to the consuming public, thereby making such wheel assembly economically available to the buying public.

Still another object of the present invention is to provide a new wheel assembly that provides in the apparatuses and methods of the prior art some of the advantages thereof, while simultaneously overcoming some of the disadvantages normally associated therewith.

Even still another object of the present invention is to provide a wheel assembly that provides a wheel assembly convenient for installation and tire changes. And further that is interchangeable with different styles of wheel assembly in an easy manner.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 13 is an exploded view of the wheel assembly constructed in accordance with the principles of the present invention.

FIG. 18 is a perspective view of the front of yet another embodiment of the wheel assembly constructed in accordance with the principles of the present invention.

FIG. 19 is a side view of yet another embodiment of the wheel assembly assembled and constructed in accordance with the principles of the present invention.

FIG. 20 is an exploded side view of yet another embodiment of the wheel assembly constructed in accordance with the principles of the present invention.

The same reference numerals refer to the same parts throughout the various figures.

DESCRIPTION OF THE PREFERRED EMBODIMENT

Figures 1, 2:
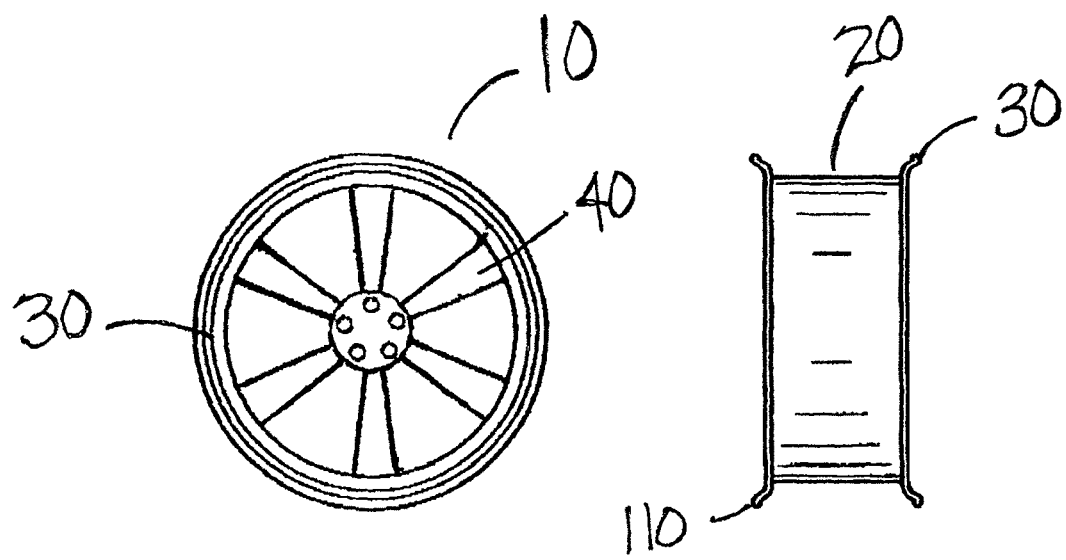
FIG. 1 is a perspective view of the front of the wheel assembly constructed in accordance with the principles of the present invention.
FIG. 2 is a side view of the wheel assembly assembled and constructed in accordance with the principles of the present invention.

Referring now to the drawings, a preferred embodiment of the wheel assembly of the present invention is shown and generally designated by the reference numeral 10.

Figure 3:
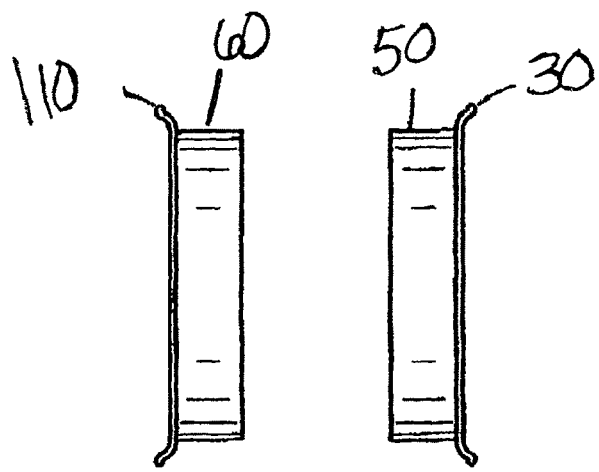
FIG. 3 is an exploded side view of the wheel assembly constructed in accordance with the principles of the present invention.
Figure 4:
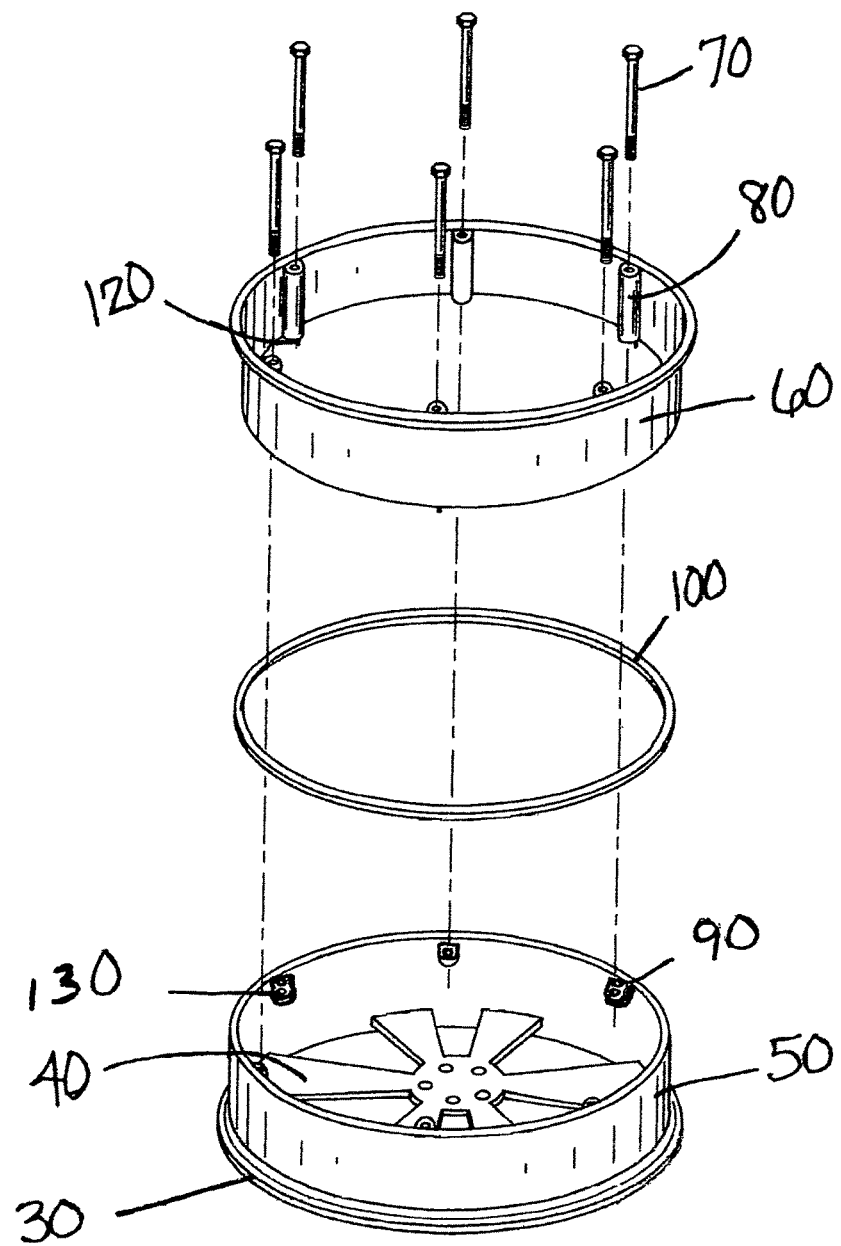
FIG. 4 is an exploded view of the wheel assembly constructed in accordance with the principles of the present invention.

In FIGS. 1 and 2, a new and improved wheel assembly 10 of the present invention is illustrated and will be described. The wheel assembly 10 has a central circular body 20 and a lip on each end 30 and 110. The wheel assembly may have spokes 40 meeting in a circular hub. It is understood that the format of spokes are not limited to those shown in FIG. 1, and any decorative theme that is structurally sound is encompassed by the present invention. FIG. 3 shows that the wheel assembly 10 of FIG. 2 is made of two halves 50 and 60 that are essentially equal in size. FIG. 4 shows an exploded view that illustrates the assembly of the wheel assembly of the present invention. The two halves of the wheel assembly, 50 and 60 are joined by bolts 70 with a gasket 100 there between. One half 50 contains the spokes 40 and a means 90 to receive the boils 70. Gasket 100 functions to seal the first and second halves together. The other half 60 contains means 80 for accepting or receiving bolts 70. Bolts 70 are of sufficient length to go through 80 of 60 and through 90 of 50. The half 60 also contains alignment pegs 120 on the bolt receiving means that fit into alignment holes 130 of the bolt receiving means of the half 50. Three alignment pegs/alignment peg holes are shown in FIG. 4.

Figure 5:
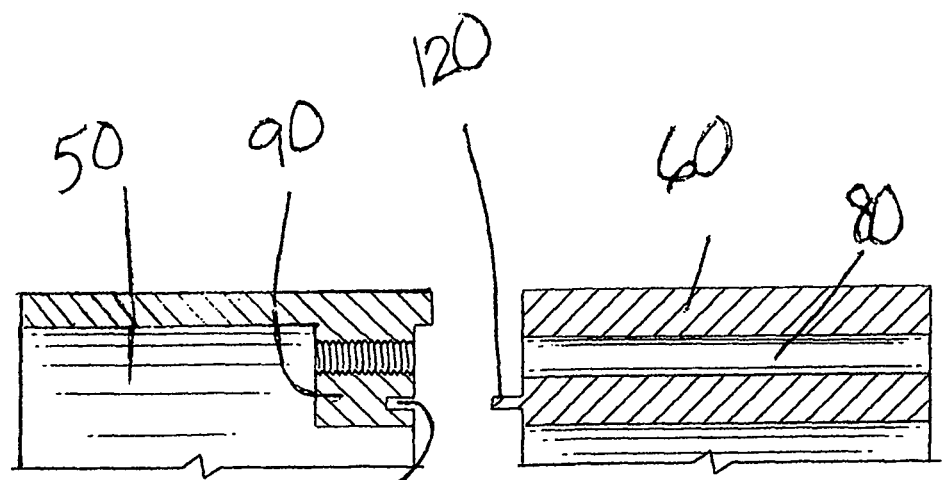
FIGS. 5-7 are exploded view showing assembly of the wheel assembly constructed in accordance with the principles of the present invention.
Figure 6:
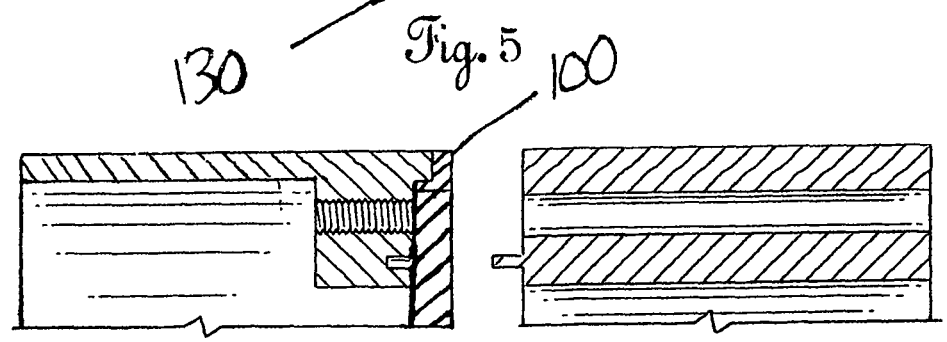
Figure 7:
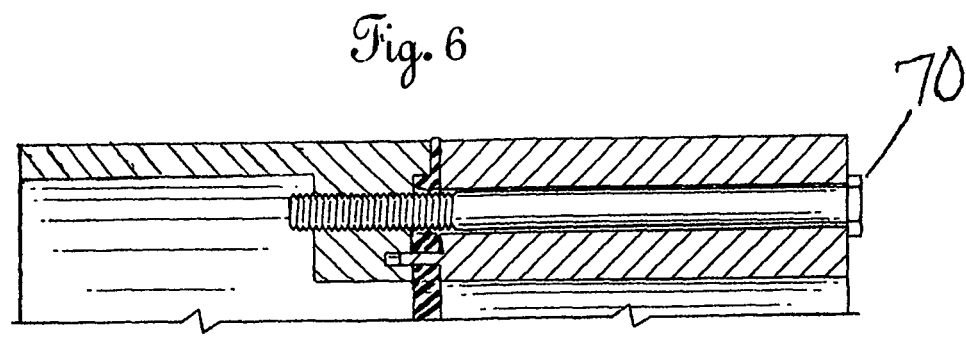

In FIGS. 5-7 describe in detail how two halves, 50 and 60 are aligned. The interior of the car rim is shown in part. The first cylindrical body 50 has threaded interior of the bolt receiving means 90 is brought into proximity with the second cylindrical body 60 so that the bolt receiving means 80 of body 60 align with the means 90 of 50. The alignment peg 120 of body 60 fits into alignment peg hole 130 of body 50. In FIG. 6, gasket is shown so that when first and second cylindrical bodies meet in FIG. 7, as sealed wheel assembly is accomplished. The car rims, when mounted on the vehicle, will have no contact or interference with the brake line of that vehicle.

Figure 8:
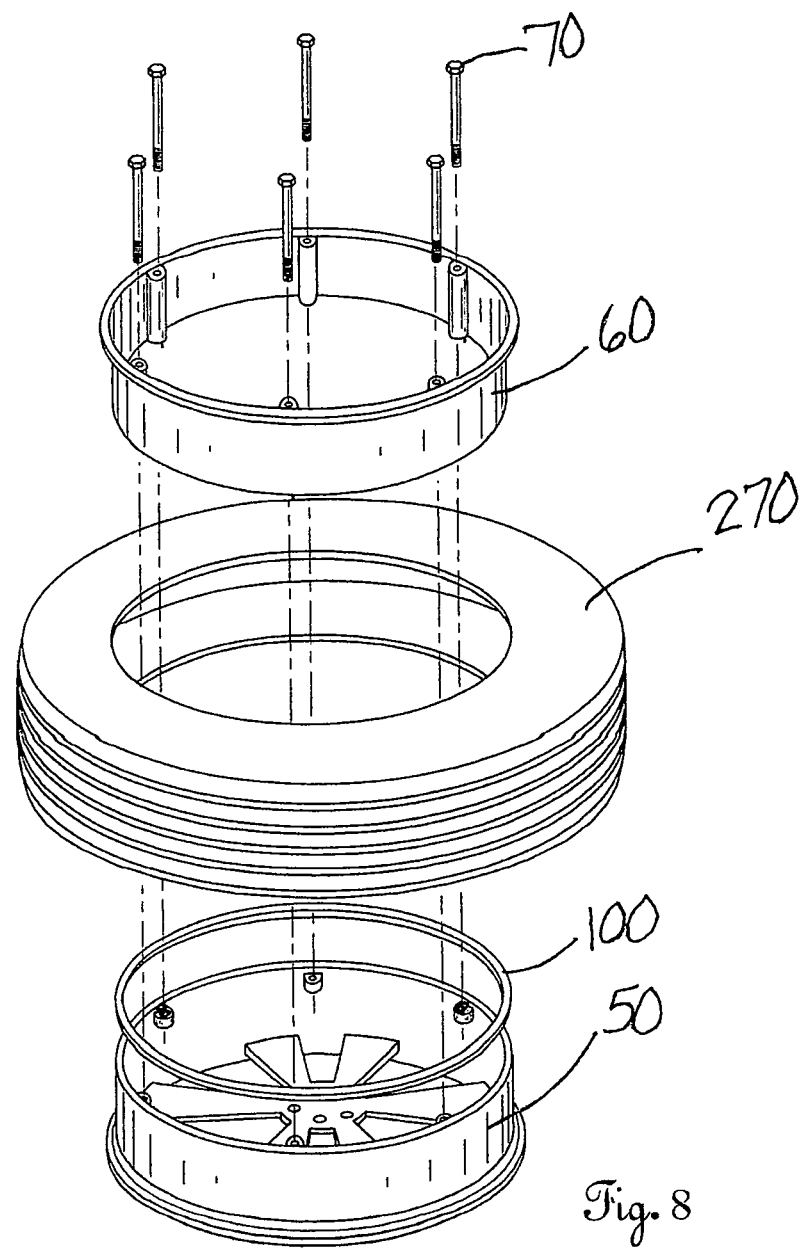
FIG. 8 is an exploded view of the wheel assembly with a tire constructed in accordance with the principles of the present invention.
Figure 9:
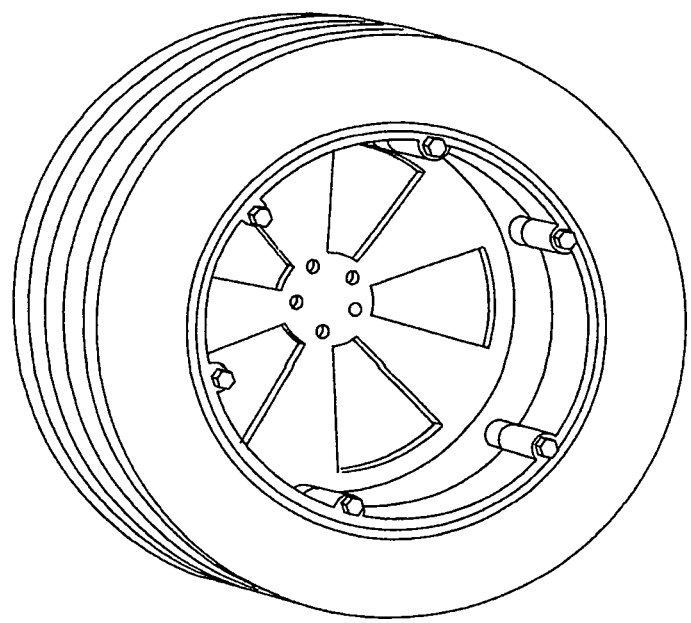
FIG. 9 is a perspective view of the backside of the wheel assembly with a tire constructed in accordance with the principles of the present invention.

FIG. 8 shows how the wheel assembly of the present invention is assembled with a tire 270 and FIG. 9 shows the rear view of the fully assembled tire and wheel assembly. In detail, it can now be understood how one would use the present invention. First lying face down the front half 50, apply the rubber gasket (adhesive) 100 to the edge (side) where the car rim opposite the lip or outer edge, mount tire over front half without disturbing the rubber gasket (adhesive), mount the back half (other halt) on top making sure the alignment pegs are in alignment holes and back half is flush with rubber gasket so as to bring both car rim halves together, placing bolts in position through back and front halves and tightening them with a torque gun or torque wrench by applying the even amount of torque to each bolt. By applying proper even torque to all individual bolts, not in sequence (1, 2, 3, 4, 5 and 6) but by tightening up a head gasket cover the same as on an engine one will ensure a stronger bond keeping air from escaping and compressing both car rim halves together securing the rubber gasket. Once tires are all assembled, simply mount them on a car, truck or bus as would any regular tire.

The following invention has the significant advantage that tire and car rim (by using a torque gun or torque wrench) can be assembled by hand thereby doing away with heavy duty-tire changing machinery and equipment.

Another significant advantage of the present invention is that this wheel assembly is a front or back that is changeable without changing the rest of the car rim parts and changeable with only a wrench.

The present invention, as demonstrated by numerous embodiments, is extremely versatile. The wheel assembly can be made of any material such as aluminum, steel, iron, alloy, chrome or other material that is not easily damaged and preferably is light weight.

In a preferred embodiment, the present invention has the advantage of parts 80 and 90 are integral parts of the molded wheel assembly. In another embodiment parts 80 and 90 are welded onto the wheel assembly.

As been described in significant detail above, the present invention encompasses wheel assemblies having the following elements: two halves, bolts and a gasket.

The first of the two halves is a cylindrical body whose diameter is approximately the same as the interior diameter of any tire so that the wheel assembly can fit into the inside of a tire. The present assembly can be used for any type of tire such as those for automobiles, trucks, RVs, motorcycles, bicycles or any other wheeled device or vehicle.

The first cylindrical half 50 has, at one edge, a lip that forms the outer edge of the wheel assembly when viewed from the front. The terms outer edge and lip are used interchangeably to describe one edge of each cylindrical body. The shape of this outer edge, lip, may be varied and encompassed by the present invention for decorative or functional purposes for example; the lip may be of any size, shape, color or material.

The first cylindrical half 50 also has six bolt receiving means at the opposite edge of the cylindrical body from the lip. Preferably there are six though more or less can be used and are encompassed by the present invention. The bolt receiving means are spaced equidistant throughout the interior of the cylindrical body. The bolt receiving means are envisioned as metal welded or integral with the first cylindrical half. In FIG. 4 the bolt receiving means is pictures as slightly below fee outer edge of fee cylindrical body. It is appreciated that the bolt receiving means may be flush with the outer edge or placed deeper in the cylindrical body and be encompassed by the present invention. The bolt receiving means should have a central hole of sufficient diameter and depth to accommodate entry of a bolt. Preferably the interior of fee bolt receiving means is threaded, grooved or ribbed in interior like that of a nut to secure the bolt. Of course, other bolt receiving means are encompassed by the present invention.

The first cylindrical half also has three alignment holes on the bolt receiving means that will receive alignment pegs from fee bolt receiving means of the second half to aid in fitting the two halves together properly. Any sort of alignment means are also encompassed by the present invention. Preferably the alignment pegs are formed integral with the first cylindrical half, though they may be added later in the manufacture process if desired. Of course more or fewer alignment peg/hole combinations are part of the present invention. For example the pegs could be on the first half, with matching alignment holes on the second half. A different number of peg/holes could be used for example 1, 2, or 4 or more. The length and size of the alignment peg/holes could be varied as needed by the user. They alignment peg/holes could be colored to aid in alignment Lastly, the first cylindrical half includes spokes that meet at a circular hub, the circular hub having holes for receiving bolts to attach the tire/rim to an automobile. FIGS. 1-9 describe one variation of spokes. Of course, the present invention can encompass any decorative variation desired.

The wheel assembly of the present invention also encompasses a second half that has a diameter identical to that of the first half. The second half has a lip at one edge of the second cylindrical body. As described above, outer edge and lip are interchangeable and describe one edge of the cylindrical body.

The second cylindrical half also includes six bolt receiving means spaced equidistant throughout the interior of the cylindrical body. The bolt receiving means are alignable with the bolt receiving means of the first half. The bolt receiving means of the second half extend from one edge of the cylindrical body to the opposite edge, along the interior of the second cylindrical half. However, other variations in the size and length of the bolt receiving means are encompassed by the present invention. The bolt receiving means are preferably of integral construction with the cylindrical half, but they may be added later such as by welding. In general, the bolt receiving means of the second cylindrical half are of sufficient diameter to accommodate entry of a bolt and the interior of the bolt receiving means of the second cylindrical half are smooth.

The second cylindrical half also has three alignment pegs that match three alignment peg holes of the first cylindrical half. As discussed above variations in the number, depth, and other characteristics of the peg holes and pegs of the two cylindrical halves are encompassed by the present invention.

The wheel assembly of the present invention also includes six bolts that run through the bolt receiving means of the second half, through the bolt receiving means of the first half and extending therefrom. The bolts maybe constructed of any material and be of any length, diameter or shape as desired by the consumer. Of course the number of bolts used may be varied as desired by the consumer and are encompassed by the present invention.

The gasket located between the first and second halves. The gasket may be rubber. The gasket may be an adhesive or rubber coated in adhesive. The purpose of the gasket is to help the first and second halves of the wheel assembly met in an air tight and secure manner. To this end the term gasket may encompass any material that fulfills this function including, for example, an adhesive tape or string. Generally the gasket is identical in diameter to the two cylindrical bodies and fits smoothly onto the edge opposite the lip of each cylindrical body.

It is noted that the terms first cylindrical half, second cylindrical halve, circular body, front and back half, and first and second half are interchangeable. Generally, first cylindrical body, first and front refer to 50 and second cylindrical half second and back refer to 60. What is meant by a cylindrical halve or circular body is one half of the wheel assembly of the present invention.

In this first described embodiment, the first half and second half are equal in size. This is shown in FIG. 2 and is intended to include wheel assemblies wherein each cylindrical body represents one half of the total width of the wheel assembly body as a whole. Now two other embodiments of the present invention will be shown and described. In these embodiments, the two cylindrical bodies that, together with bolts and gasket form, a wheel assembly are not equal. One is significantly smaller than the other. That is to say the cylindrical bodies in these embodiments each have an identical diameter and fit together with bolts and gasket substantially as described above. These cylindrical bodies however, are not identical in depth.

Figures 10, 11:
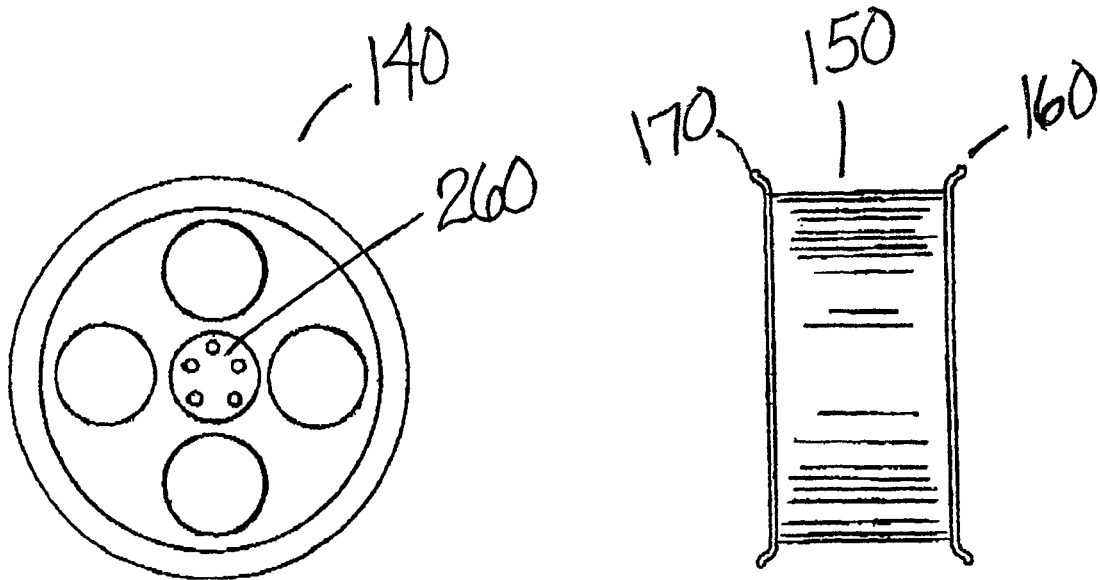
FIG. 10 is a perspective view of the front of another embodiment of the wheel assembly constructed in accordance with the principles of the present invention.
FIG. 11 is a side view of another embodiment of the wheel assembly assembled and constructed in accordance with the principles of the present invention.
Figure 12:
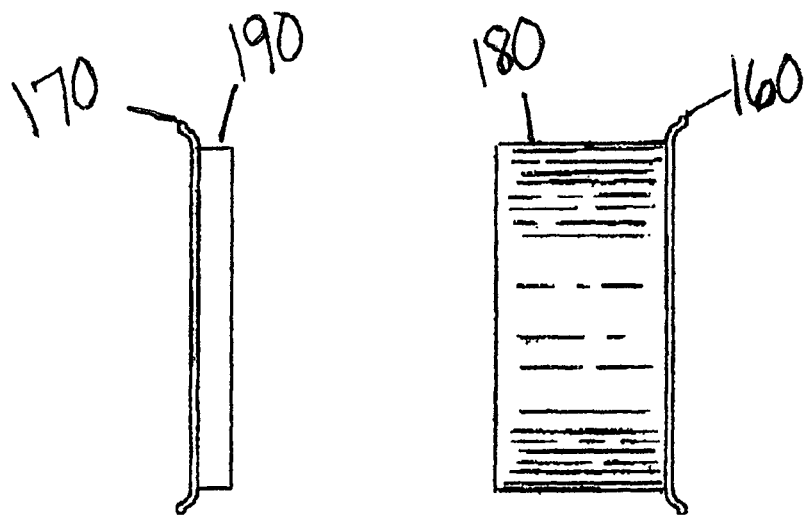
FIG. 12 is an exploded side view of another embodiment of the wheel assembly constructed in accordance with the principles of the present invention.

An embodiment of the present invention is shown in FIGS. 10-17. In FIGS. 10 and 11, a new and improved wheel assembly 140 of the present invention is illustrated and will be described. The wheel assembly 140 has a central circular body 150 and a lip on each end 160 and 170. The wheel assembly has a circular hub with holes 260 to accommodate bolts needed to attach wheel assembly to wheel axle. It is understood that the format of spokes are not limited to those shown in FIG. 10, and any decorative theme that is structurally sound is encompassed by the present invention. FIG. 12 shows that the wheel assembly 140 of FIG. 11 is made of two first 180 and second cylindrical 190 bodies that are of different in sizes. FIG. 13 shows an exploded view that illustrates the assembly of the wheel assembly of the present invention. The two cylindrical bodies of the wheel assembly, 180 and 190 are joined by bolts 200 with a gasket 210 there between. Cylindrical body 180 contains a means 220 to receive the bolts 200 and four alignment pegs 230. Four alignment pegs and six bolts are shown in the embodiment of the invention in FIGS. 10-17. The bolt receiving means in pictured in FIGS. 13-16 as a continuous band located within the interior of the half with six bolt accommodating holes therein. The interior of these holes is preferably smooth. It is appreciated that the number of pegs and bolts, and hence bolt receiving means, can be varied within the scope of the present invention. It is also appreciated that the bolt receiving means and cylindrical body may be a single article of manufacture or the bolt receiving means may be added to the cylindrical body. It is also appreciated the that bolt receiving means may be of a different shape, such as item 130 in FIG. 4 or the like. Gasket 210 functions to seal the first and second cylindrical bodies together. The other cylindrical body 190 contains holes 240 for accepting bolts 200.

The interior of the holes is preferably threaded to secure the bolts. The depth, width and spacing of the bolt holes may be varied to align, with the body 180 and bolts 200 used. Bolts 200 are of sufficient length to go through 230 of 180 and into and through the holes 240 of 190. The cylindrical body 190 also contains alignment pegs holes 250 that align with pegs 230 of 180. Four alignment pegs/holes are shown in FIG. 13. It is appreciated that the number, depth, color and other characteristics of the alignment peg holes may be varied within the scope of the present invention. Cylindrical body 190 also contains holes 260 through which bolts may secure the wheel assembly to the axle of a wheeled vehicle. The front face of 190 is shown with four circles. It is appreciated that the design, number and shapes of the front face may be changed as preferred by the consumer and within the scope of the present invention.

Figure 15:
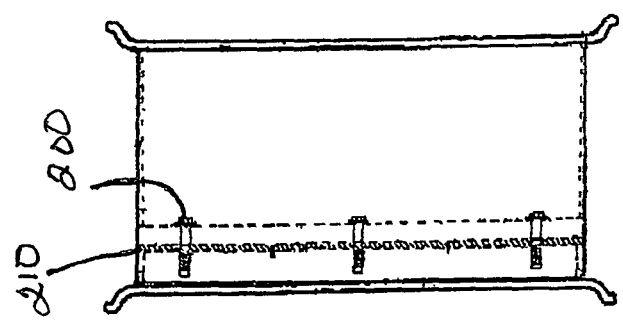
FIGS. 14-15 are side views showing assembly of another embodiment of the wheel assembly constructed in accordance with the principles of the present invention.
Figure 14:
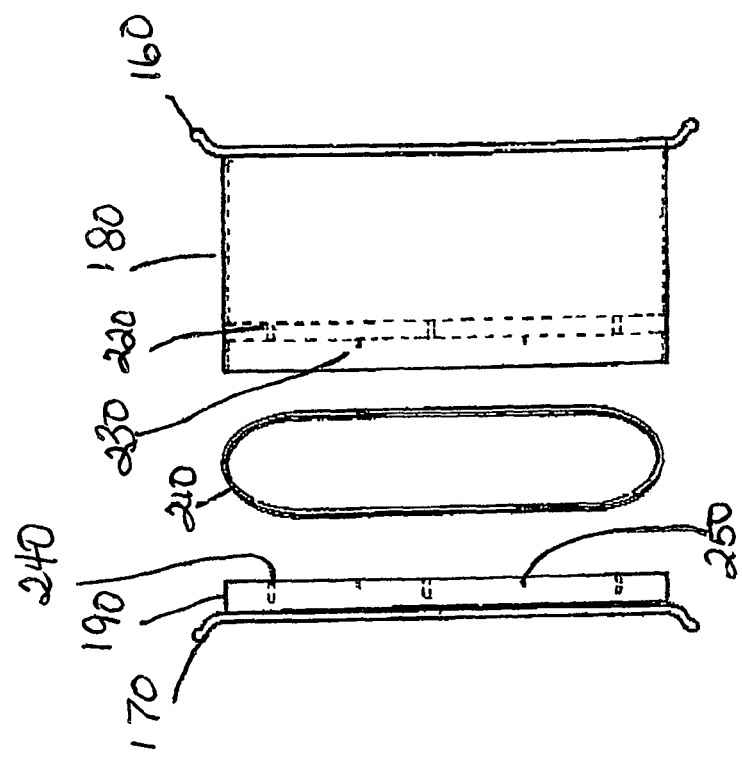
Figure 16:
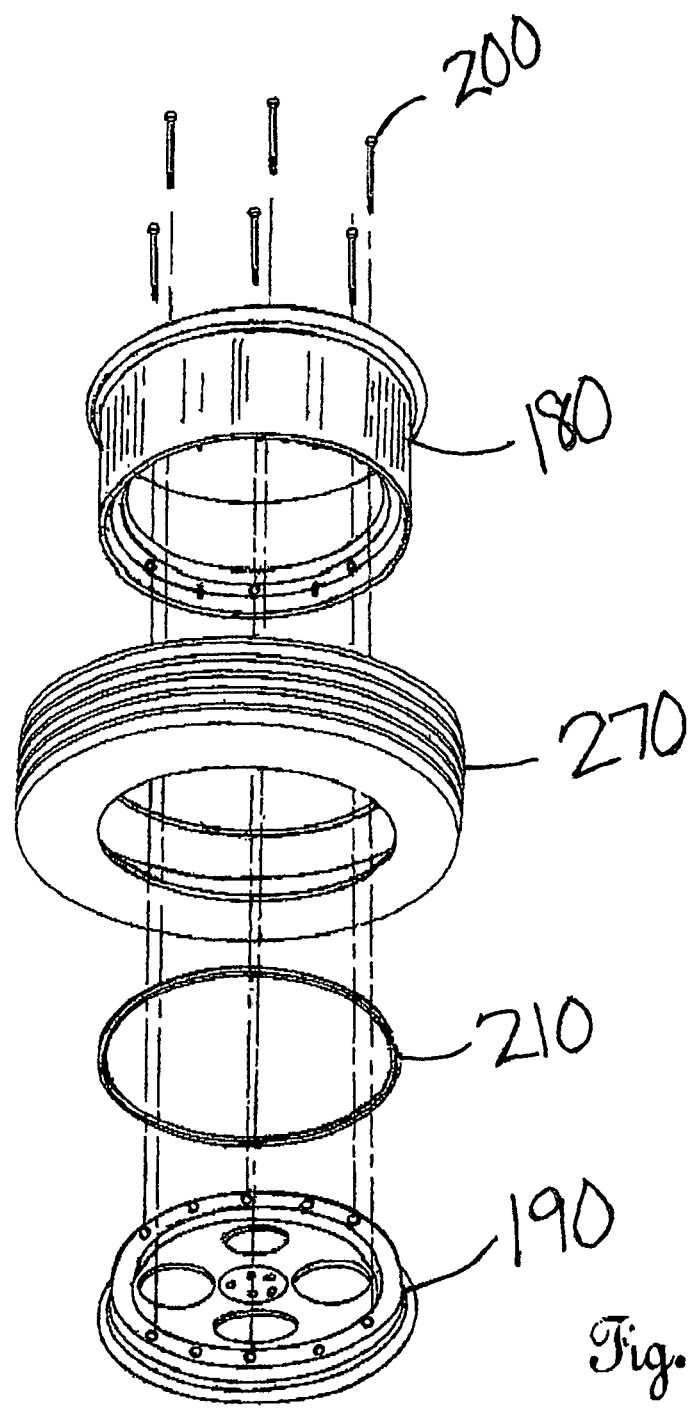
FIG. 16 is an exploded view of another embodiment of the wheel assembly with a tire constructed in accordance with the principles of the present invention.

FIGS. 14 and 15 demonstrate how the tire vehicle assembly is assembled. Gasket 210 is placed between front and back cylindrical bodies. Bolts are placed through bolt receiving means 220 of cylindrical body 180 and into holes 240 of cylindrical body 190 with the gasket 210 in place to make an air tight seal between the two cylindrical bodies.

Figure 17:
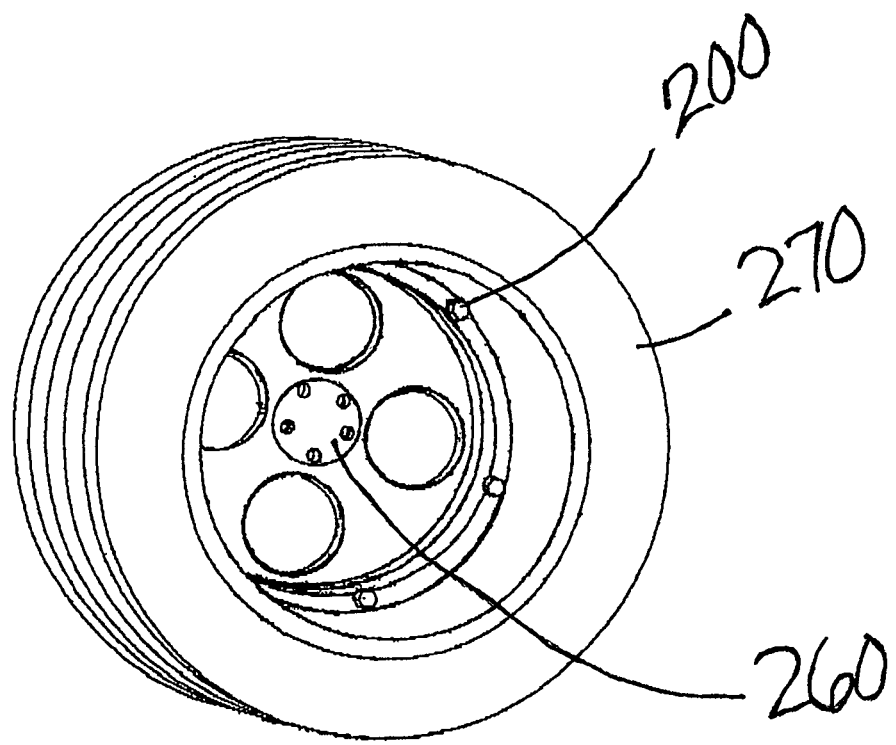
FIG. 17 is a perspective view of the backside of another embodiment of the wheel assembly with a tire constructed in accordance with the principles of the present invention.

FIG. 10 demonstrates how the tire vehicle assembly works with a tire 270. FIG. 17 demonstrates the rear view of the fully assembled tire and wheel assembly.

Figure 21:
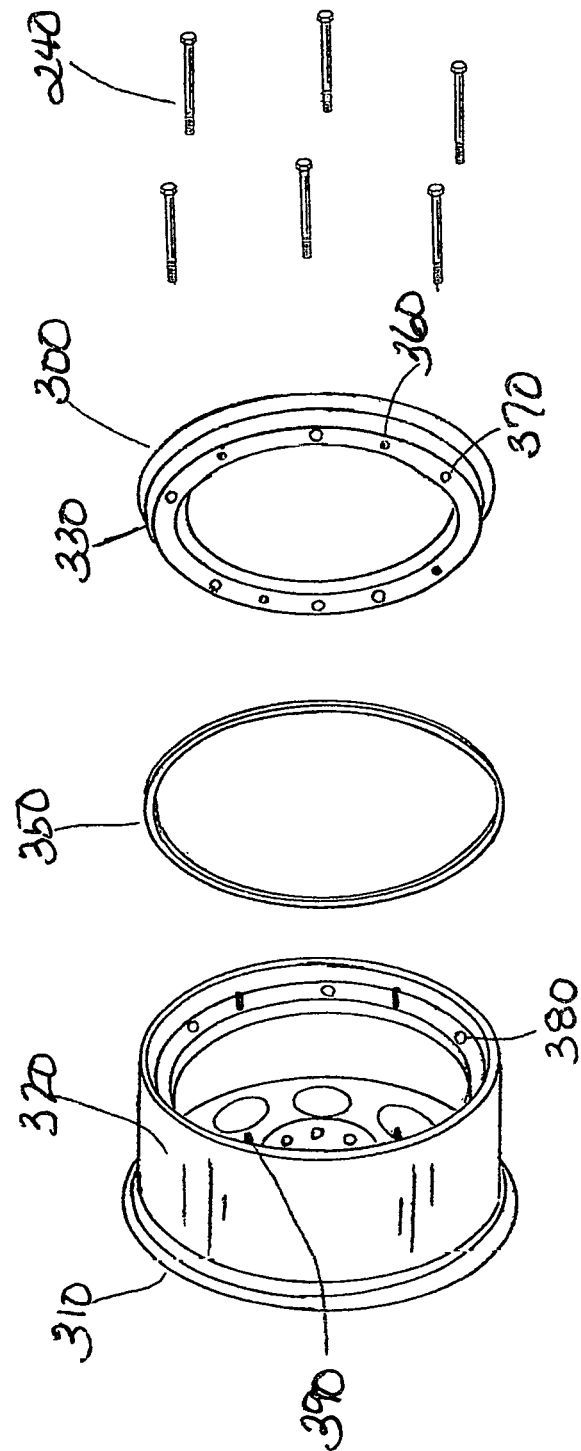
FIG. 21 is an exploded view of yet another embodiment of the wheel assembly constructed in accordance with the principles of the present invention.

Yet another embodiment of the present invention is shown in FIGS. 18-25. This embodiment is distinct from the other embodiments in that in the first embodiment the two cylindrical bodies are of equal depth. In the second embodiment, the front or first cylindrical body, e.g. that that includes holes that attach to wheel axel centrally located thereupon, is short in depth and the back or second cylindrical body is deep. In this third embodiment the first or front cylindrical body that contains holes through which bolts secure the wheel assembly to the axle of a wheeled vehicle is deep and the back or second cylindrical body is not. In FIGS. 18 and 19, a new and improved wheel assembly 280 of the present invention is illustrated and will be described. The wheel assembly 280 has a central circular body 290 and a lip on each end 300 and 310. The wheel assembly has a circular hub with holes 340 to accommodate bolts needed to attach wheel assembly to wheel axle. It is understood that the format of spokes are not limited to those shown in FIG. 18, and any decorative theme that is structurally sound is encompassed by the present invention. FIG. 20 shows that the wheel assembly 280 of FIGS. 18-19 is made of two parts, a first 320 and second cylindrical 330 bodies that are of different in sizes. FIG. 21 show's an exploded view that illustrates the assembly of the wheel assembly of the present invention. The two cylindrical bodies of the wheel assembly. 320 and 330 are joined by bolts 340 with a gasket 350 there between. Cylindrical body 330 contains a means, such as a hole 370 to receive the bolts 340 and four peg alignment holes 360. The interior of the holes is preferably smooth. The depth, width and spacing of the bolt holes may be varied to align, with the body 320 and bolts 340 used. Four alignment peg holes and six bolts are shown in the embodiment of the invention in FIGS. 18-25. It is appreciated that the number of pegs and bolts, and hence bolt receiving means, can be varied within the scope of the present invention. Gasket 350 functions to seal the first and second cylindrical bodies together. The other cylindrical body 320 contains, a one edge an outer edge or lip 310 and at or near the opposite edge, bole receiving means 380. The bolt receiving means in pictured in FIGS. 18-25 as a continuous band located within the interior of the cylindrical body with six bolt accommodating holes therein. The interior of these holes is preferably threaded to secure a bolt. It is also appreciated that the bolt receiving means and cylindrical body may be a single article of manufacture or the bolt receiving means may be added to the cylindrical body. It is also appreciated the that bolt receiving means may be of a different shape, such as item 130 in FIG. 4 or the like. Bolts 340 are of sufficient length to go through 370 of 330 and into and through the bolt receiving means 380 of 320. The cylindrical body 320 also contains alignment pegs 390 that align with holes 360 of 330. Four are shown in FIG. 21. It is appreciated that the number, depth, color and other characteristics of the alignment peg and alignment peg holes may be varied within the scope of the present invention. Cylindrical body 320 also contains holes 340 through which bolts may secure the wheel assembly to the axle of a wheeled vehicle. The front face of 320 is shown with four ovals. It is appreciated that the design, number and shapes of the front face may be changed as preferred by the consumer and within the scope of the present invention.

Figure 22:
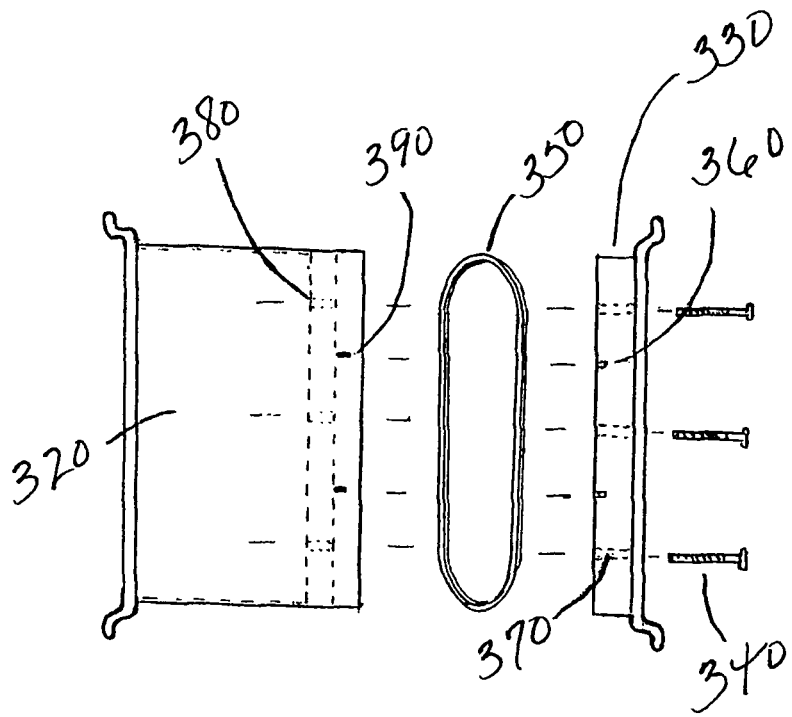
FIGS. 22-23 are side views showing assembly of yet another embodiment of the wheel assembly constructed in accordance with the principles of the present invention.
Figure 23:
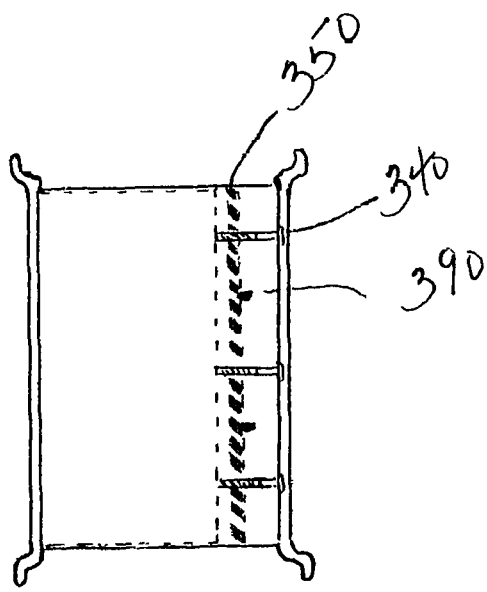

FIGS. 22 and 23 demonstrate how the tire vehicle assembly is assembled. Gasket 350 is placed between front and back cylindrical bodies 320 and 330. Bolts 340 are placed through bolt receiving holes 370 of cylindrical body 330 and into bolt receiving means 380 of cylindrical body 320 with the gasket 350 in place to make an air tight seal between the two cylindrical bodies.

Figure 24:
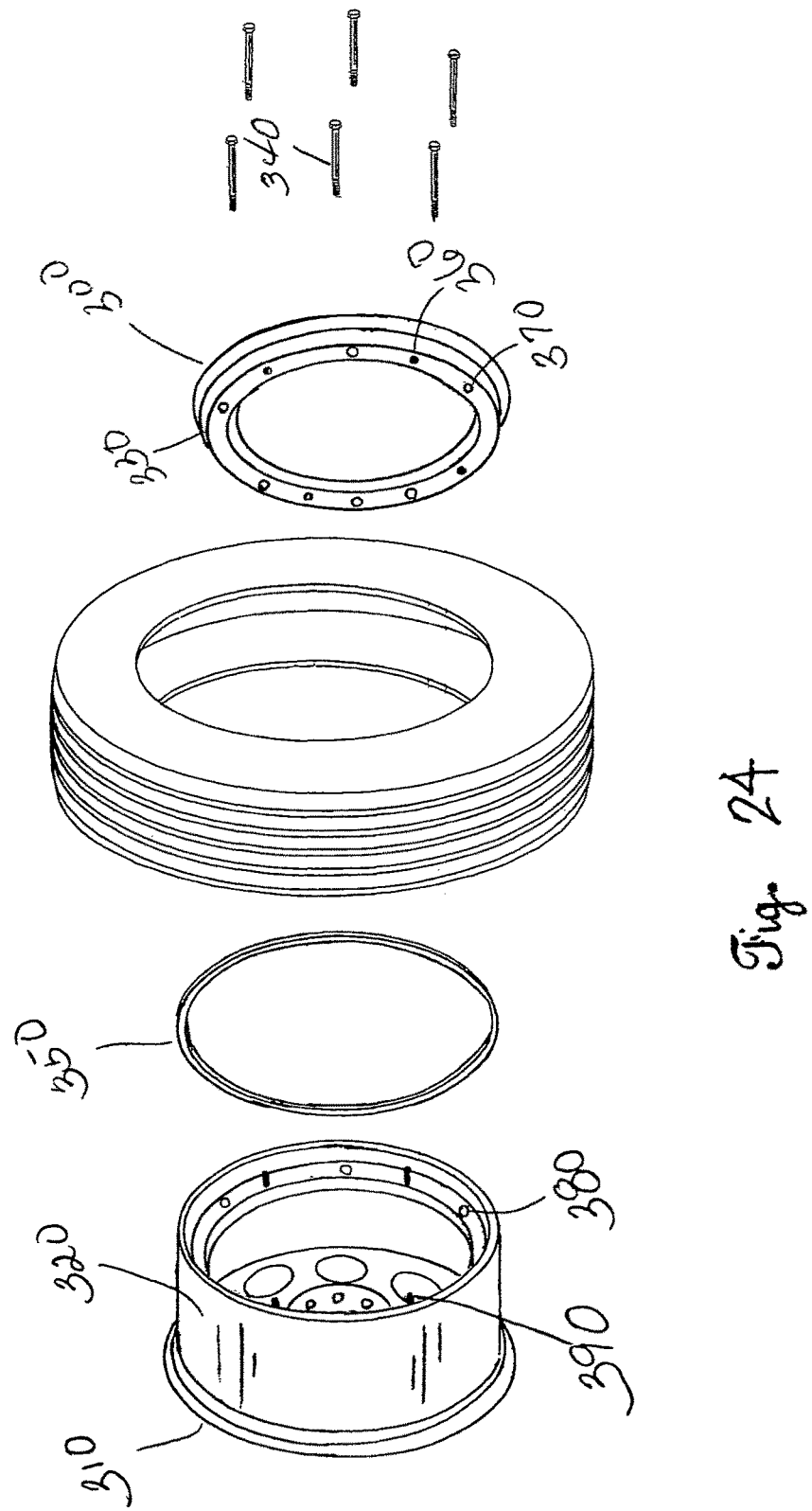
FIG. 24 is an exploded view of yet another embodiment of the wheel assembly with a tire constructed in accordance with the principles of the present invention.
Figure 25:
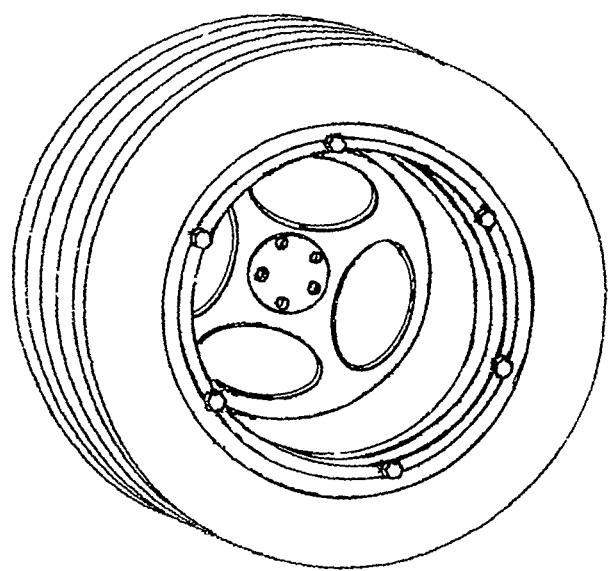
FIG. 25 is a perspective view of the backside of yet another embodiment of the wheel assembly with a tire constructed in accordance with the principles of the present invention.

FIG. 24 demonstrates how the tire vehicle assembly works with a tire 270 and FIG. 25 demonstrates the rear view of the completed tire and wheel assembly.

While preferred embodiments of the wheel assembly have been described in detail, it should be apparent that modifications and variations thereto are possible, all of which fail within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as aluminum or metal alloys that are lightweight and durable may be used. Furthermore, a wide variety of thicknesses of materials or basic shape and size of the wheel assembly may be varied.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheel assembly comprising:
   a rim that receives a tire wherein the rim includes a first half and a second half;
   a gasket disposed between the first and second halves wherein said gasket is configured to seal the first and second halves together;
   wherein the first and second halves each include a circular body and a lip extending in an outwardly radial direction away from the circular body;
   wherein an outer diameter of the circular body of the first half and an outer diameter of the circular body of the second half are substantially equal;
   wherein the first half comprises six bolt receiving means proximate an edge of the first half opposite to another edge of the first half where the lip of the first half is disposed, wherein the six bolt receiving means are spaced circumferentially equidistant throughout the interior of the cylindrical body of the first half, wherein the six bolt receiving means of the first half each include a threaded bolt receiving hole and wherein every other bolt receiving means, extending circumferentially, includes a peg receiving hole,
   wherein said peg receiving holes are disposed radially inward of the threaded bolt receiving holes;
   wherein the first half includes spokes that meet at a circular hub, the circular hub having holes for receiving fasteners to attach the wheel assembly to an axle;
   the second half comprises six bolt receiving means that are substantially aligned with the threaded bolt receiving holes, wherein every other of the six bolt receiving means of the second half extending circumferentially is disposed radially outward of a peg wherein said pegs extend in an inwardly axial direction and wherein each peg is configured to be received in a respective peg receiving hole of the first half;
   wherein the means for accepting bolts of the second half extend from the radially inner surface of the second half in an inwardly radial direction and further extend in an axial direction substantially from one edge of the second half, wherein the lip of the second half is disposed, to an edge of the second half that is positioned opposite the edge of the second half with the lip, wherein the six bolt receiving means of the second half are spaced circumferentially equidistant throughout the interior of the cylindrical body;
   bolts that extend through the bolt receiving means of the second half and through the threaded bolt holes of the first half and wherein a threaded end of the bolts extends away from the threaded bolt holes so that the threaded ends of the bolts is disposed between the bolt receiving means of the first half and the spokes.

2. The wheel assembly of claim 1, wherein the first half and the second half are substantially equal in size with respect to the axially extending length of each half.

* * * * *